Patented Nov. 21, 1933

1,935,623

UNITED STATES PATENT OFFICE 1,935,623

COLORATION OF MATERIALS COMPRISING CELLULOSE DERIVATIVES

George Holland Ellis, Denis Houghton Mosby, and Henry Charles Olpin, Spondon, near Derby, England, assignors to Celanese Corporation of America, a corporation of Delaware No Drawing. Application August 2, 1928, Serial No. 297,093, and in Great Britain January 30, 1928

2 Claims. (Cl. 8—5)

This invention relates to the dyeing, printing, stenciling or otherwise coloring of threads, yarns, knitted or woven fabrics or other products made with or containing cellulose acetate or other organic esters of cellulose, for example cellulose formate, propionate or butyrate or the products obtained by treatment of alkalized cellulose with esterifying agents (e. g. the product known as "immunized cotton" made with p-toluene sulphochloride), or made with or containing cellulose ethers, for instance methyl, ethyl or benzyl cellulose or the corresponding condensation products of cellulose and glycols or other polyhydric alcohols, all of which cellulose derivatives are hereinafter referred to as organic substitution derivatives of cellulose.

We have found that colorations which are particularly valuable can be obtained on materials made with or containing cellulose acetate or other organic substitution derivatives of cellulose by means of azo dyes and preferably unsulphonated dyestuffs containing the anthraquinone nucleus and accordingly the present invention comprises applying the said azo dyes in substance to the materials or forming them on the materials.

The azo dyes may be prepared either in substance or upon the material by diazotizing primary anthraquinones or derivatives thereof and coupling or developing with any suitable components, for example p-xylidine, cresidines, anisidines, m-toluidine, m-phenylenediamine, nitro-m-phenylenediamine, phenol, m-aminophenol, monacetyl-m-aminophenol, dimethyl-m-aminophenol, α-naphthylamine, ω-hydroxyethyl-α-naphthylamine, γ-chlor-β-hydroxypropyl-α-naphthylamine, β-naphthylamine, 1-amino-2-methoxy-naphthalene, aminonaphthoic acids and side-chain and nuclear substitutions thereof, etc. For producing the dyestuffs on the fibre or material, the amino-anthraquinone or derivative thereof may, for example, be applied first diazotized on the material and developed, or the coupling component may be applied first and developed with a diazotized derivative of anthraquinone.

The anthraquinone nuclei, in addition to containing a group or groups necessary for the formation of the azo dyes, may contain any other desired substituent groups, for example, carboxyl, alkyl, halogen, amino, alkyl-amino, acidylamino, nitro, hydroxy, alkoxy and mercapto groups.

The following are examples of azo dyes which may be applied according to the present invention, but it will be understood that the listing of these examples implies no limitation of the invention thereto.

| Component | Diazotized and coupled with | Shade |
|---|---|---|
| 1-aminoanthraquinone | Phenol | Yellow |
| 1-aminoanthraquinone | m-toluidine | Yellow |
| 1-aminoanthraquinone | o-anisidine | Golden orange |
| 1-aminoanthraquinone | m-phenylene diamine | Yellowish-brown |
| 1-aminoanthraquinone | Anthranilic acid | Golden orange |
| 1-aminoanthraquinone | β-aminonaphthoic acid | Bluish-red |
| 1-amino-2-methyl-anthraquinone | Phenol | Yellow |
| 1-amino-2-methyl-anthraquinone | m-toluidine | Golden orange |
| 1-amino-2-methyl-anthraquinone | Dimethyl-m-aminophenol | Orange |
| 1-amino-2-methyl-anthraquinone | m-phenylene diamine | Golden brown |
| 1-aminoanthraquinone-2-carboxylic acid | m-toluidine | Golden yellow |
| 1-amino-4-hydroxy-anthraquinone | Phenol | Brownish-yellow |
| 1-amino-4-hydroxy-anthraquinone | m-toluidine | Golden yellow |
| 1-amino-4-hydroxy-anthraquinone | m-phenylene diamine | Greenish-black |
| 1-amino-4-acetyl amino-anthraquinone | β-aminonaphthoic acid | Red-brown |
| 1:4-diamino-anthraquinone diazotized | β-aminonaphthoic acid (1 mol.) | Red-brown |
| 1:5-diamino-anthraquinone (diazotized) | Phenol (1 mol.) | Golden brown |
| 1:5-diamino-anthraquinone (diazotized) | m-toluidine (1 mol.) | Orange |
| 1:5-diamino-anthraquinone (tetrazotized) | Phenol (1 mol.) and m-toluidine (1 mol.) | Orange |
| 1:8-diamino-anthraquinone (diazotized) | Phenol (1 mol.) | Golden orange |
| 1:8-diamino-anthraquinone (diazotized) | m-toluidine (1 mol.) | Orange |
| 1:8-diamino-anthraquinone (diazotized) | m-phenylenediamine (1 mol.) | Brownish-red |
| 2-aminoanthraquinone | β-aminonaphthoic acid | Orange-red |

The dyestuffs to be applied in substance or the components (for forming the dyes on the fibre), where insufficiently soluble in water, may be applied to the goods in aqueous suspension or dispersion, obtained, for example, by colloidal grinding, by dissolving in a solvent and mixing with water containing or not containing a protective colloid, by pretreating with dispersing agents or by other methods. As dispersing agents suitable for obtaining such dispersions those described in prior U. S. Patents Nos. 1,618,413, 1,618,414, and 1,694,413, and 1,840,572 dated Jan. 12, 1932 and 1,716,721 dated June 11, 1929 may be instanced, viz bodies of oily or fatty characteristics, namely higher fatty acids or sulphonate or other derivatives thereof containing salt forming groups, such as sulphoricinoleic acid or other sulphated fatty acids or salts of such acids or bodies, for instance their alkali or ammonium salts, used alone or in conjunction with auxiliary solvents as described in U. S. Patent No. 1,690,481 and U. S. Patent No. 1,803,008 dated Apr. 28, 1931; carbocyclic compounds containing in their structure one or more sulphonic or other salt-forming groups or salts of such compounds; sulpho-aromatic fatty acids or salts thereof; and soluble resin soaps or salts or other soluble salts of resin acids.

The following examples illustrate the dyeing of goods according to the present invention, but are not to be regarded as in any way limiting its scope.

*Example 1*

To dye a yellow shade on 10 kilograms of cellulose acetate knit fabric, 400 grams of anthraquinone-1-azo-m-toluidine 25% aqueous paste are finely ground and there are added with stirring 300-400 grams of the sulpho-aromatic fatty acid product prepared as follows:—

25 kilograms of naphthalene are mixed with 25 kilograms of oleic acid by warming to 80° C. The mass is then cooled quickly and the resultant paste is added slowly to 100 kilograms of 20% oleum with vigorous agitation, the temperature being kept below 40° C. When the addition is complete the temperature is raised very gradually to 100° C., at which it is maintained for 3 hours. Care is needed during this heating to prevent a frothing. After cooling, the mixture is poured into 250 litres of water and treated with 50 kilograms of common salt. The whole is allowed to separate, when the top aqueous layer is decanted off leaving an oily product which is washed several times with 20% brine.

The mixture is heated until the maximum degree of dispersion is achieved and then diluted with boiling water and added through a sieve into a suitable dyeing machine containing 300 litres of water. The goods are entered, and processed with rising temperatures according to the common methods of dyeing until the shade is achieved. The goods are now lifted, rinsed and dried, or otherwise treated as requisite.

*Example 2*

To dye an orange shade on 10 kilos of cellulose acetate yarn in hank form, 100 grams of finely ground 2-methyl-anthraquinone-1-azo-dimethyl-metaamino-phenol are well stirred or ground with 1 litre of sodium sulphoricinoleate (50%); the mixture is heated under an open steam pipe and then diluted with boiling water and further boiled. The liquor is then passed through a filter-cloth into a dyebath containing 300 litres of cold soft water. 10 kilos of the material are introduced and dyeing carried out as usual, the temperature being raised to 75-80° C., and maintained at this figure as necessary to exhaust. The hanks are now lifted, rinsed, and dried or otherwise treated as requisite.

*Example 3*

To dye 10 kilos of cellulose acetate knitted goods a golden orange shade, 100 grams of anthraquinone-1-azo-anthranilic acid are dissolved as the ammonium salt in a dyebath containing 300 litres of water, and the previously wetted out goods entered. The temperature is raised slowly to 75-80° C., and maintained at this figure till the requisite depth is achieved. Exhaustion may be assisted by addition of 2-3% formic acid on weight of goods towards the end of the dyeing operation. The goods are now lifted, rinsed, and dried or otherwise treated as requisite.

*Example 4*

To dye 10 kilos of cellulose acetate knitted goods a bluish red shade, 200 grams of anthraquinone-1-azo-2-amino-3-naphthoic acid are dissolved as the ammonium salt in a dyebath containing 300 litres of soft water, to which ½-1 cc. per litre of Turkey Red Oil (50%) has been added. The previously wetted out goods are now entered, and the temperature raised slowly to 75-80° C., and maintained at this figure till the requisite shade is obtained. The goods are now lifted, rinsed, and dried or otherwise treated as requisite.

*Example 5*

To dye a red-brown shade on 10 kilos of cellulose acetate yarn in hank form, 200 grams of the dyestuffs 4-amino-anthraquinone-1-azo-2-amino-3-naphthoic acid are well stirred with 1 litre of sodium sulphoricinoleate (50%). The mixture is heated under an open steam pipe till a good dispersion is obtained and then diluted with boiling soft water. The liquor is then passed through a filter cloth into a dyebath containing 300 litres of cold soft water. The material is then entered, and dyeing carried out as usual, the temperature being raised to 75-80° C., and maintained at this figure as necessary to exhaust. The hanks are now lifted, rinsed, and dried or otherwise treated as requisite.

In a similar manner other azo dyestuffs containing anthraquinone nuclei may be used to color cellulose acetate, and furthermore, colorations may be similarly obtained on materials comprising other organic substitution derivatives of cellulose, for example cellulose formate, cellulose butyrate, "immunized cotton", methyl or ethyl cellulose etc.

Azo dyestuffs containing diazotizable amino groups may be diazotized on the material to produce further dyestuffs.

Mixed goods containing for example, in addition to the organic substitution derivative or derivatives of cellulose, cotton, silk, wool, or the cellulose type of artificial silk or other threads or fibres, may also be dyed or otherwise colored according to the present invention with or without employment of other dyestuffs or components according to the character of the threads or fibres used in association.

The term coloring used in the claims is to be understood to include all methods of coloring and more particularly dyeing, printing and stencilling.

What we claim and desire to secure by Letters Patent is:—

1. Process for coloring materials comprising organic substitution derivatives of cellulose, comprising applying thereto in substance unsulphonated azo dyestuffs containing an anthraquinone nucleus, and an aminonaphthoic acid nucleus, no saponification of the said cellulose derivatives taking place during such application.

2. Process for coloring materials comprising cellulose acetate, comprising applying thereto in substance unsulphonated azo dyestuffs containing an anthraquinone nucleus, and an aminonaphthoic acid nucleus, no saponification of the cellulose acetate taking place during such application.

GEORGE HOLLAND ELLIS.
DENIS HOUGHTON MOSBY.
HENRY CHARLES OLPIN.